United States Patent [19]

Yabuya

[11] Patent Number: 5,228,611
[45] Date of Patent: Jul. 20, 1993

[54] CONTAINER HOLDER

[75] Inventor: Shigeru Yabuya, Aichi, Japan

[73] Assignee: Toyoda Gosei Co., Ltd., Nishikasugai, Japan

[21] Appl. No.: 697,968

[22] Filed: May 10, 1991

[30] Foreign Application Priority Data

May 11, 1990 [JP] Japan .................................. 2-49329
Dec. 21, 1990 [JP] Japan ................................ 2-401306

[51] Int. Cl.⁵ ............................................. B60N 3/10
[52] U.S. Cl. ..................................... 224/281; 224/282;
224/42.44; 248/311.2; 296/37.12; 312/319.1
[58] Field of Search ................ 224/273, 275, 281, 282,
224/42.42, 42.44, 42.43; 248/311.2, 309.1, 310,
240.1; 296/37.8, 37.9, 37.12; 267/156, 272, 275;
312/319, 320, 319.1, 319.5, 319.8; 108/45, 44,
46; 211/74-77

[56] References Cited

U.S. PATENT DOCUMENTS

| | | | |
|---|---|---|---|
| 2,510,545 | 6/1950 | Brabham | 211/74 |
| 3,132,892 | 5/1964 | Stevens | 324/282 X |
| 4,494,806 | 1/1985 | Williams et al. | 224/281 X |
| 4,660,881 | 4/1987 | Komeya et al. | 296/37.9 |
| 4,712,845 | 12/1987 | Nicol | 312/319 |
| 4,826,058 | 5/1989 | Nakayama | 224/42.44 |
| 4,892,281 | 1/1990 | Difilippo et al. | 248/311.2 |
| 4,953,771 | 9/1990 | Fischer et al. | 224/273 |
| 4,953,772 | 9/1990 | Phifer | 224/282 |
| 5,052,728 | 10/1991 | Fukumoto | 224/281 X |
| 5,060,899 | 10/1991 | Lorence et al. | 248/311.2 |
| 5,087,008 | 2/1992 | Miller et al. | 248/311.2 |

FOREIGN PATENT DOCUMENTS

| | | | |
|---|---|---|---|
| 3218178 | 11/1983 | Fed. Rep. of Germany | 296/37.9 |
| 0008550 | 1/1984 | Japan | 224/273 |
| 0209926 | 11/1984 | Japan | 296/37.9 |
| 0122742 | 5/1989 | Japan | 296/37.9 |

Primary Examiner—Henry J. Recla
Assistant Examiner—Casey Jacyna
Attorney, Agent, or Firm—Cushman, Darby & Cushman

[57] ABSTRACT

A rack is provided within an outer case. A pinion to be in mesh with the rack is provided on an inner case. A torsion coiled spring for providing the energizing force to put the inner case out of the outer case is provided between the pinion and the inner case. The energizing force of the torsion coiled spring firmly holds the inner and outer cases horizontally and vertically.

8 Claims, 9 Drawing Sheets

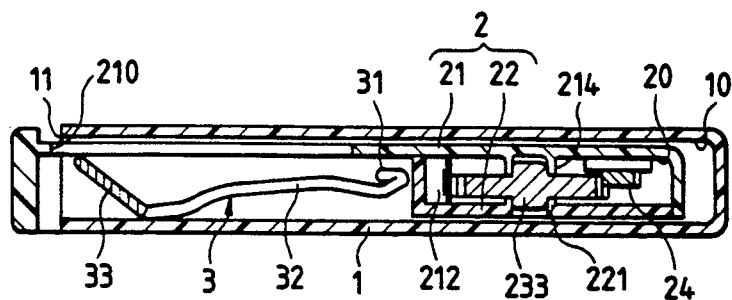
FIG. 3
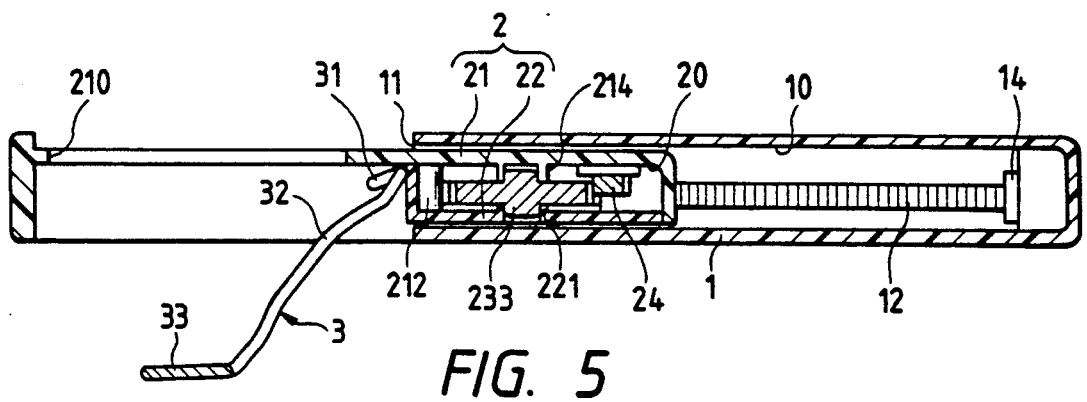
FIG. 4
FIG. 5
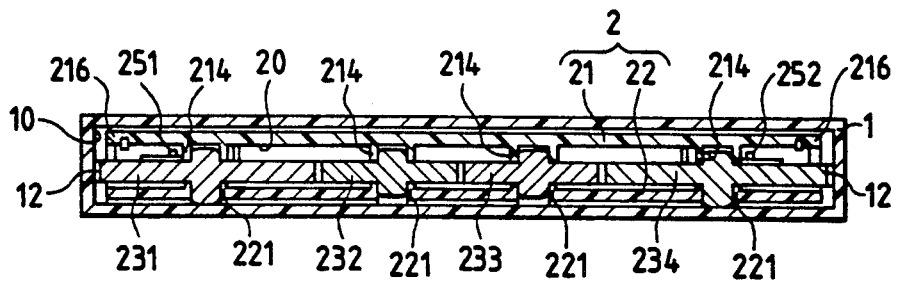
FIG. 6
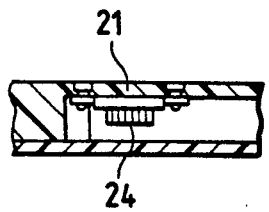

CONTAINER HOLDER

BACKGROUND OF THE INVENTION

1. Field of the Invention

The present invention relates to a container holder for holding containers, such as canned juice and paper cups, which is used installed in automobiles, for example, buses and passenger cars.

2. Description of the Prior Art

FIG. 13 shows a conventional container holder including an outer case 500 having an opening at one end, and an inner case 600 formed with holder holes 601 for receiving containers. The inner case 600 is held by the outer case in such a way that the inner case may be selectively positioned within or outside of the outer case through substantially horizontal movement. A swing frame (not shown), which is supported by the inner case 600, may be swung with respect to the inner case. The swing frame includes a holder section to hold the containers in cooperation with the holder holes 601 of the inner case 600.

An engaging member 503 with a coiled spring 502, and a push-lock-open clip 504 are disposed on the inner surface 501 of the rear wall of the outer case 500. Guide rails 505, serving to guide the inner case 600, are formed on the inner surfaces of the side walls of the outer case. On a rear wall 602 of the inner case 600, is an engaging hole 603, serving to engage the engaging member 503, and a lock pin 604, releasably locked into the push-lock-open clip 504.

In the container holder thus constructed, if the inner case is pushed by the finger or the like, toward the outer case 500 fixed to the car body or the like, the inner case 600 and the swing frame are pushed out of the outer case 500 by the biasing force of the coiled spring 502 while being guided by the guide rail 505, until the engaging hole 603 engages the engaging member 503 at the leading position, that is, the inner case 600 is spaced apart from the outer case 500 by enough distance (approximately 30 mm) so as to not be flush with that outer case and to receive a finger tip or the like. Thereafter, the inner case 600 is further pulled out of the outer case with the finger or the like, so that the swing frame turns with respect to the inner case by a predetermined angle and the holder section of the swing frame is maintained at a predetermined position with respect to the inner case.

Under this condition, containers, such as canned juice, are held within the holder holes 601 by the holder section. When not in use, the front end of the inner case can be pushed whereby the swing frame is pushed by the outer case 500 and turns upwardly and the engaging hole 603 engages with the engaging member 503. Further pushing against the biasing force of the coiled spring 502 results in the push-lock-open clip 504 engaging the lock pin 604 and becoming interlocked. At this point, the inner case and the swing frame are both accommodated within the outer case.

The above-described container holder, however, suffers from the problem of being impossible to operate with a single action whereby it is ready to hold containers. That is, to set up such a state, it is necessary to push the inner case 600 to release the push-lock-open clip 504 from the lock pin 604, so they can be disengaged from each other, and, thereafter, to pull the inner case out of the outer case with the operator's finger. When the container holder is installed in a passenger car, an operator must pull the inner case 600, with the finger or the like, out of the outer case until the inner case 600 can hold a container. During the course of such a manipulation, there is a tendency that the operator's arm will touch the torque control lever or the like. In this respect, the prior container holder is not always satisfactory when it is manipulated.

Further, in the above-described prior container holder, when it is assembled, clearances are inevitably formed in the top and bottom portions, and the right and left portions of the holder. As a result of these inevitable clearances, the inner case 600 is loosely coupled with the outer case 500, offensive sounds can be generated or it is possible to scratch the container holder per se.

SUMMARY OF THE INVENTION

Accordingly, an object of the present invention is to provide a container holder which with a good manipulation, can effectively prevent the generation of the offensive sound and prevent the scratching of the container holder itself. To achieve the above object, there is provided a container holder including a box-like outer case having an opening at one end, and an inner case having at least one holder hole for receiving a container and held by the outer case in such a way that the inner case through substantially horizontal movement may be selectively positioned within or outside of the outer case. In such a container holder, the improvement is made wherein the outer case includes at least one rack formed on an inner surface which extends in the direction in which the inner case is placed in and removed from the outer case, with the inner case including a pinion rotatably supported so as to mesh with the rack, and a torsion coiled spring, of which one end is held by the pinion and the other end is held within the outer case. The spring provides the biasing force to drive the pinion in the direction in which the inner case, while positioned within the outer case, is moved out of the outer case. The spring's pinion biasing force and a resultant axial biasing force cooperate to firmly hold the inner and outer cases both horizontally and vertically.

When the container holder is installed in a vehicle, for example, the outer case may be fixed to a proper part of the vehicle, such as a console box, a glove box, seat, or an instrument panel. A guide means for guiding the inner case, for example, a rail like ridge or groove, is preferably formed in the outer case. The outer case may be arcuately configured.

At least one holder hole receiving a container, such as a can and a paper cup, is formed in the inner case. The holder hole may take the form of a circle, square or any other suitable shape. The inner case may also be used as a glove box. When the outer case is arcuate, the inner case may be shaped arcuate in conformity with the outer case.

The outer case and the inner case may be provided with a push-lock-open clip and a lock pin, respectively, in order to interlock them.

The inner case may rotatably support a swing frame with a holder section for holding the container in cooperation with the holder hole of the inner case. The swing frame may be arranged so as to drop by its weight or by biasing means, for example, a spring, when the inner case is pulled out of the outer case. It is also possible to utilize the force of this spring as the axial biasing force to hold the inner and outer cases vertically in addition to or in place of the afore-mentioned axial biasing force which acts on the pinion in the axial direction thereof.

In the container holder, the outer case includes at least one rack formed on the inner surface and extending in the direction in which the inner case is moved into and out of the outer case. In the inner case, a pinion is rotatably supported in mesh with the rack. A torsion coiled spring drives the pinion in the direction in which the inner case, while positioned within the outer case, is moved out of that case. As a direct result, the inner case can be automatically pulled out of the outer case. When the container holder is installed in a passenger car, this automatic feature minimizes the likelihood of the operator's arm touching the torque control lever as it is not necessary to manually pull the inner case out of the outer case until the inner case can hold the container.

When the outer case is arcuate, and the inner case is shaped arcuate in conformity with the outer case, the inner case is pulled out of the outer case through an arcuate path. Therefore, the problem of having the operator's arm touch the torque control lever is further reduced.

Irrespective of the clearances between the inner and outer cases at the top and bottom, and the right and left, which clearances are inevitably present between these cases, the pinion biasing force and the axial biasing force of the torsion coiled spring cooperate to hold the outer case and the inner case under a pressed condition. Therefore, those cases are firmly held and do not cause clatter.

Other objects, features and advantages of the present invention will be apparent from the following description taken in connection with the accompanying drawings, in which:

BRIEF DESCRIPTION OF THE DRAWINGS

FIG. 3 is a sectional view taken along line A—A in FIG. 1;

FIG. 4 is a sectional view taken along line D—D in FIG. 2;

FIG. 5 is a sectional view taken along line B—B in FIG. 1;

FIG. 6 is a sectional view taken along line C—C in FIG. 1;

DETAILED DESCRIPTION OF THE PREFERRED EMBODIMENTS

Figure 1:
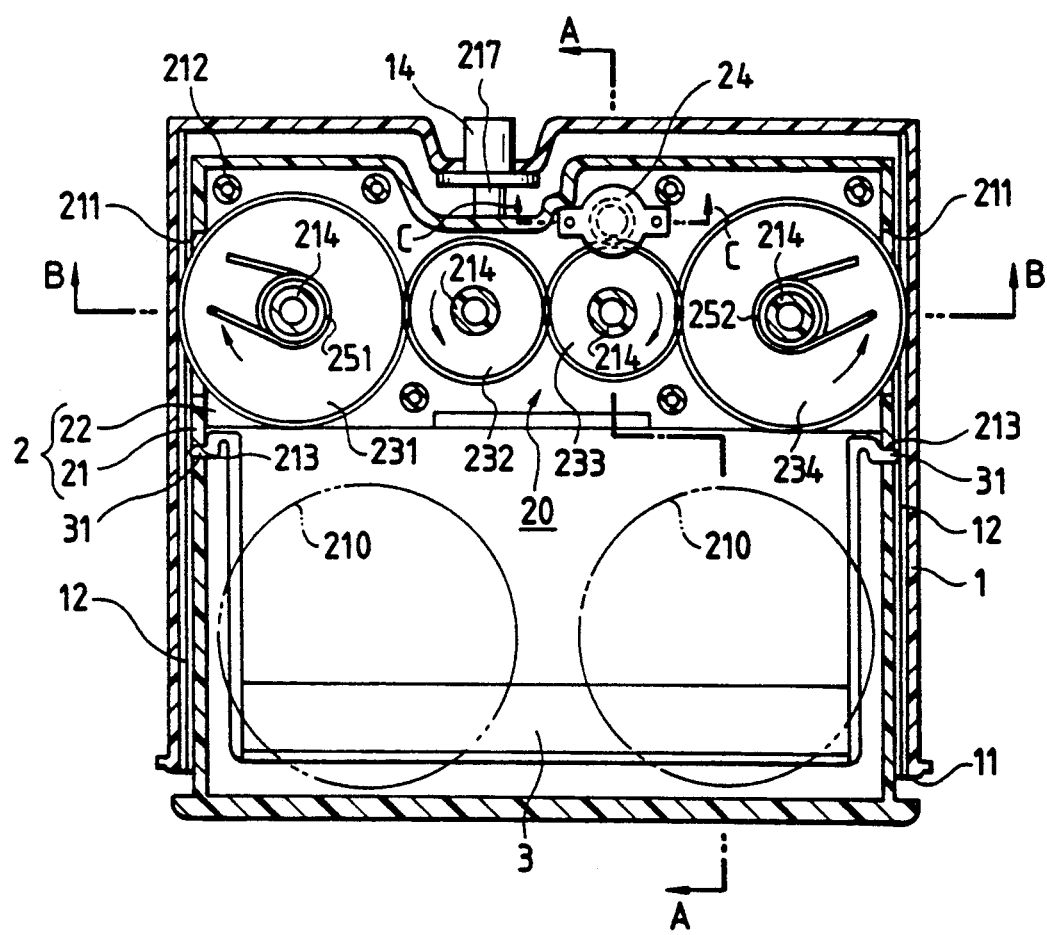
FIG. 1 is a horizontal sectional view showing a container holder according to a first embodiment of the present invention in a state where an inner case is positioned within an outer case.

The present invention will be described in detail with reference to the accompanying drawing.

A container holder according to a first embodiment of the present invention will be described. In the first embodiment, the container holder is adapted for use in a passenger car. The container holder, as shown in FIGS. 1 and 2, includes an outer case 1, an inner case 2 coupled with the outer case 1 in such a way that the inner case can move into and out of the outer case, and a swing frame 3 rotatably supported by the inner case 2.

The outer case 1, as also shown in FIGS. 3 and 4, is shaped like a box, and includes a chamber 10 formed therein and an opening 11 in the forward portion. The outer case 1 is fixed to an instrument panel (not shown) of a vehicle. Racks 12, extending in the in- and out-directions in which the inner case is moved into and out of the outer case, are respectively provided on the inner surfaces of both sides of the outer case 1. Guide holes 13, illustrated in FIG. 7, which serve to guide the inner case 2 and serve to define an in/out length of the inner case, are formed in the top wall of the outer case 1. A known push-lock-open clip 14 is provided on the rear wall of the chamber 10 of the outer case 1.

Figure 2:
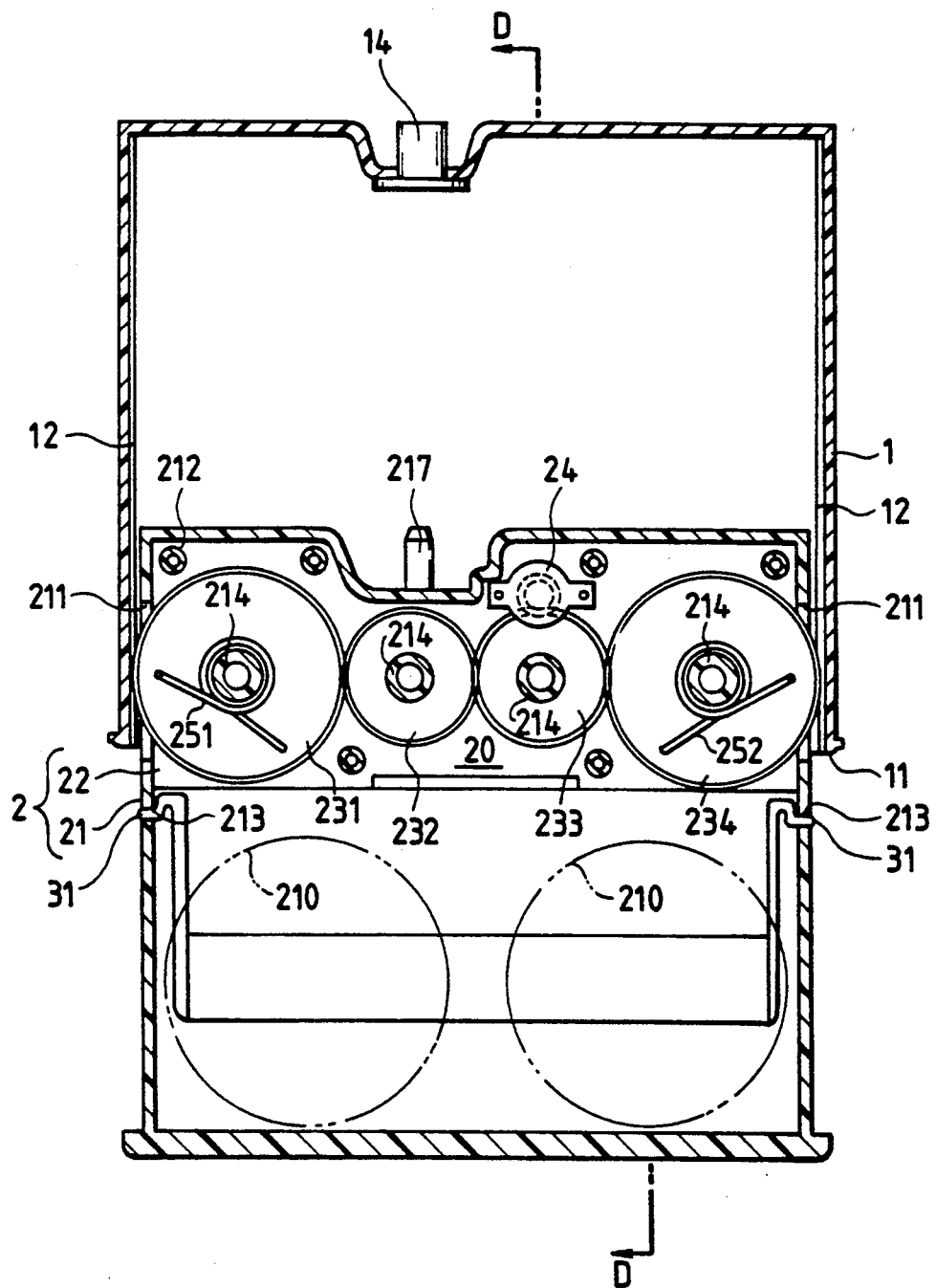
FIG. 2 is a horizontal sectional view showing the container holder in a state where the inner case is positioned outside of the outer case so as to allow a user to access to containers held by the holder.
Figure 7:
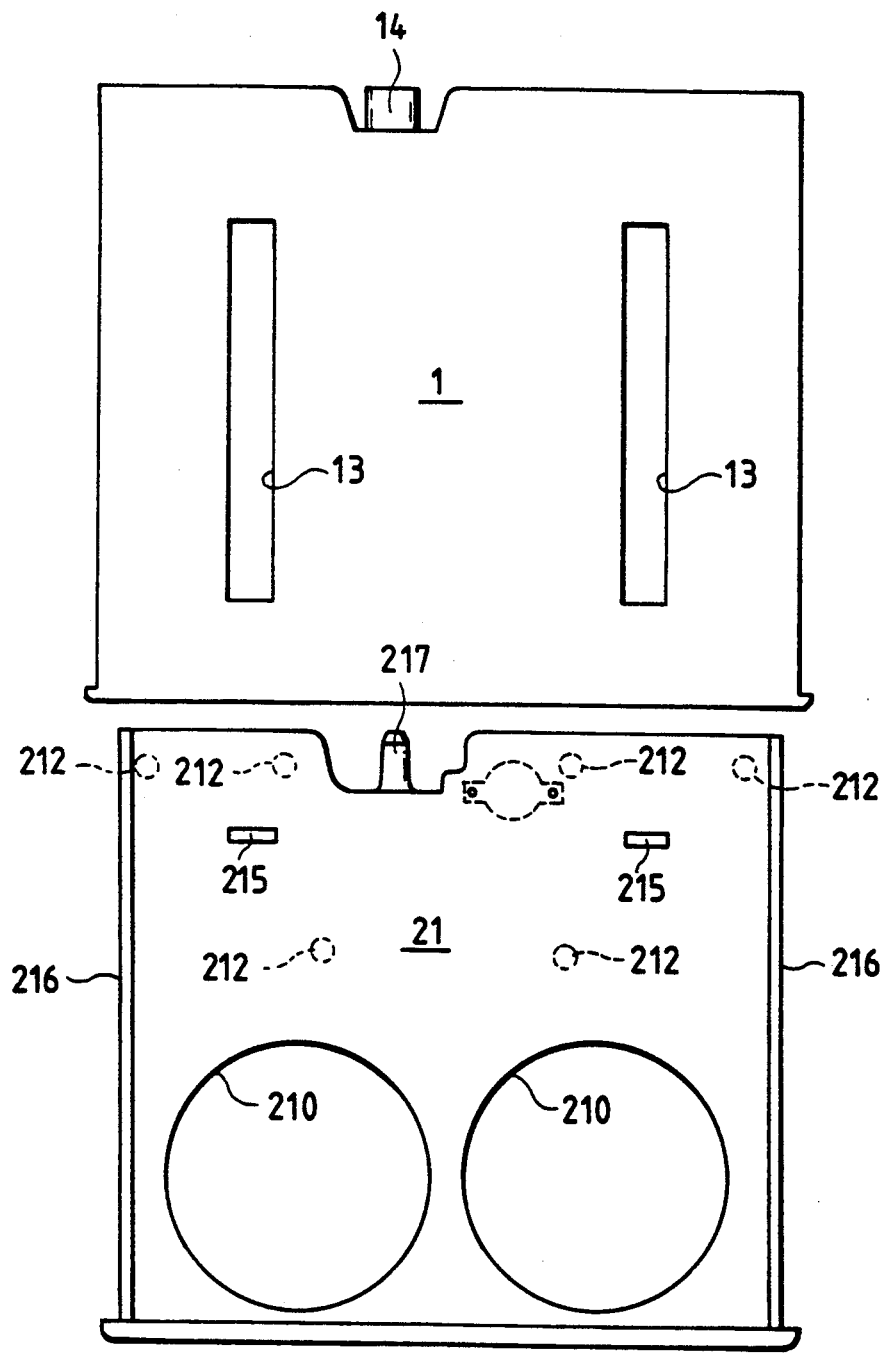
FIG. 7 is a plan view showing the inner and outer cases of the container holder of the first embodiment.

The inner case 2, as shown in FIGS. 1 and 2, is installed so as to be capable of movement into and out of the outer case 1 in substantially the horizontal direction. The inner case 2 includes a main body 21, which does not have a bottom wall, and a bottom member 22 forming a gear chamber 20 in cooperation with the rear wall and the side walls of the main body 21. The main body 21 includes two circular holder holes 210 juxtaposed in the forward portion of the top wall, openings 211 formed in both of the side walls which define the gear chamber 20, six engaging portions 212, which are provided for on the inner surface of the top wall, and serve to fix the bottom member 22 by means of screws, bearings 213 which are formed- in both side walls and are oppositely arranged, and serve to rotatably support the swing frame 3, four bearings 214, as shown in FIGS. 3 to 5, juxtaposed in the rearward portion of the inner surface of the top wall, two engaging lugs 215 which, as shown in FIG. 7, protrude from the outer surface of the top wall and are guided by guide holes 13, and contact ridges 216 which protrude upwardly from the main body 21 top wall to contact the inner surface of the top wall of the outer case 1.

The rear wall of the main body 21 includes a lock pin 217 which can be releasably locked into the push-lock-open clip 14. Four bearings 221, as shown in FIGS. 3 through 5, are formed in the inner surface of the bottom wall of the bottom member 22 so as to be confronted by the bearings 214. The gear chamber 20 defined by the main body 21 and the bottom member 22 contains, as shown in FIGS. 1 and 2, four pinions 231, 232, 233 and 234 which are rotatably supported by bearings 214 and 221 so as to be in mesh with one another, an oil damper 24 fixed to the main body 21, which, as shown in FIG. 6, includes a gear meshing with the pinion 233, and two torsion coiled springs 251 and 252. The first ends of each spring 251 and 252 are supported by the pinions 231 and 234, respectively, and the second ends of which are supported by the main body 21, as shown in FIGS. 1, 2 and 5. The pinions 231 and 234 are paired and designed so as to have the same pitch circles, modules and the like. The same thing is true for the pinions 232 and 233.

The pinions 231 and 234 partially protrude from the openings 211 of the main body 21, respectively, and engage with the racks 12 of the outer case 1 under a pressed condition. One turn of each pinion is set to be equal to the travel length of the inner case 2 when it is moved from a stored to or in use position. The torsion coiled springs 251 and 252 are held so as to provide the biasing force to drive the pinions 231 and 234 in the direction in which the inner case 2 is drive out of the outer case 1.

As can be seen in FIG. 5, the torsion coiled springs 251 and 252 can also be used to create a biasing force which acts in the axial direction. The biasing force of each spring presses the bottom end of the shafts of the pinions 231 and 234 against the inner surface of the bottom wall of the outer case 1.

The swing frame 3, as shown in FIGS. 1 and 2, includes a pair of shafts 31 which are rotatably supported by the bearings 213 of the inner case 2, side bars 32, which horizontally extend from the shafts 31 toward the rear side (in the in-direction of the in- and out-directions of the inner case), and which are bent to extend toward the front side (in the out-direction), and a holder portion 33 connecting those side bars 32 to each other.

In the container holder thus constructed, when not in use, the push-lock-open clip 14 and the lock pin 217 are interlocked with each other, and the opening 11 of the outer case 1 is closed by the front end of the inner case 2. When use is desired, an operator slightly pushes the front end of the inner case 2 with his finger or the like toward the outer case 1 such that the combination of the clip 14 and the pin 217 are released from the locked state. The state of the container holder when the clip-pin combination is unlocked is illustrated in FIGS. 1 and 3. In the container holder of the instant embodiment, in response to such a single action by the operator, the biasing forces of the torsion coiled springs 251 and 252 start to drive the pinions 231 and 234.

The pinions 231 and 234 turn on the racks 12, as shown in FIG. 1, so that the inner case 2 and the swing frame 3 are automatically pulled out of the outer case 1 by the length of one turn of each pinion 231 and 234, viz., the in/out length of the inner case 2. At this time, the pinions 231 and 234, which have been in mesh with the pinions 232 and 233, move on the racks 12 in an interlocked manner. Since the pinion 233 is in mesh with the oil damper 24, the movement of the pinions is relatively smooth.

As the inner case is pulled out of the outer case, the guide lugs 215 of the inner case 2 are guided by the guide holes 13 of the outer case 1. Because these guide holes 13 define the in/out length of the inner case 2, the inner case 2 will not move in excess of the distance resulting from one turn of each pinion 231 and 234. Thus, the container holder of the instant embodiment can be readied to hold the containers with very little operator manipulation.

As a result of this construction, even with clearances between the inner and outer cases -2 and 1 being formed at the top and bottom, and the right and left sides, both the cases 2 and 1 are held firmly against horizontal and vertical movement by the biasing forces generated by the torsion coiled springs 251 and 252. Firmly holding the respective cases results in the elimination of the clattering noises normally associated with the container holders. The springs not only act on the pinions 231 and 234, so as to press those pinions against the racks 12, the inner and outer cases 2 and 1, are firmly held vertically, not clattering, because the springs' axial biasing forces cause the bottom ends of the shaft portions of the pinions 231 and 234 to press against the inner surface of the bottom wall of the outer case 1, while the contact ridges 216 of the inner case 2 press against the inner surface of the top wall of the outer case 1.

When the inner case 2 is pulled out of the outer case 1 in this way, the swing frame 3 is also pulled out of the outer case 1, and drops by its weight. The swing frame 3 is maintained at the extreme of the swing angle by the interaction of the side bars 32 and the inner surface of the top wall of the outer case 1. The holder portion 33 of the swing frame 3 horizontally opens below the holder holes 210 of the inner case 2. Under this condition, the containers can be held by the container holder.

When not in use, the operator pushes the front end of the inner case 2 with his finger against the torsion coiled springs 251 and 252 biasing forces. Then, the swing frame 3, which has been positioned at the extreme of the swing angle, reversely or upwardly turns in contact with the outer case 1 to be in a condition for insertion into the inner case 2. The lock pin 217 is locked into the push-lock-open clip 14, and the inner case 2 and the swing frame 3 are stowed in the outer case 1. Also under this condition, the inner case 2 and the outer case 1 are firmly held by the biasing forces of the torsion coiled springs 251 and 252 applied through the rack and pinion mechanism consisting of the racks 12 and the pinions 231 and 234, irrespective of the top and bottom, and the right and left clearances which inevitably exist between the inner case 2 and the outer case 1.

As described above, the container holder of the instant embodiment can firmly hold the inner and outer cases. Accordingly, the container holder is free from the offensive sound and scratching problems created when the inner case is inserted into the outer case or when the container holder is used. Further, the lock pin 217 can be released from the locked state and the container holder may be placed into a condition for use by the one action of pushing the inner case 22 to release the push-lock-open clip 14. Accordingly, if the container holder is mounted into a passenger car, the operator's arm will rarely touch the torque control lever or the like when manipulating the container holder. In this respect, the container holder can be handled with ease.

Further, in the present container holder, there is no need to pull the inner case out of the outer case until a space large enough to receive the finger tip is formed between the inner and outer cases. In place of such a pulling action, the pinions 231 to 234 used in the instant embodiment are arranged so as to be vertical to the in- and out-directions are used in the instant embodiment. This feature reduces the space required to mount the container holder.

Figure 8:
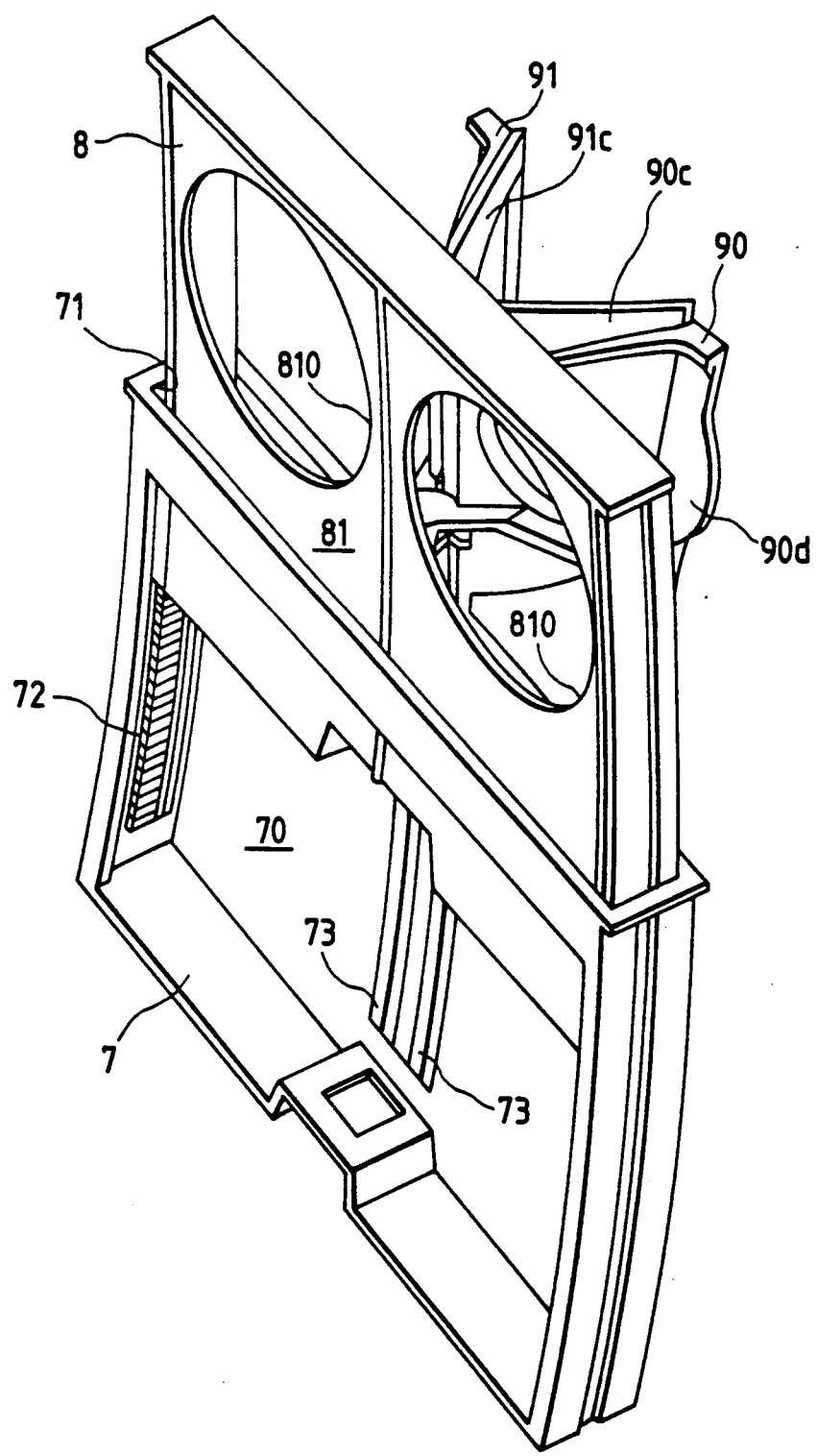
FIG. 8 is a perspective view showing a container holder according to a second embodiment of the present invention.
Figure 10:
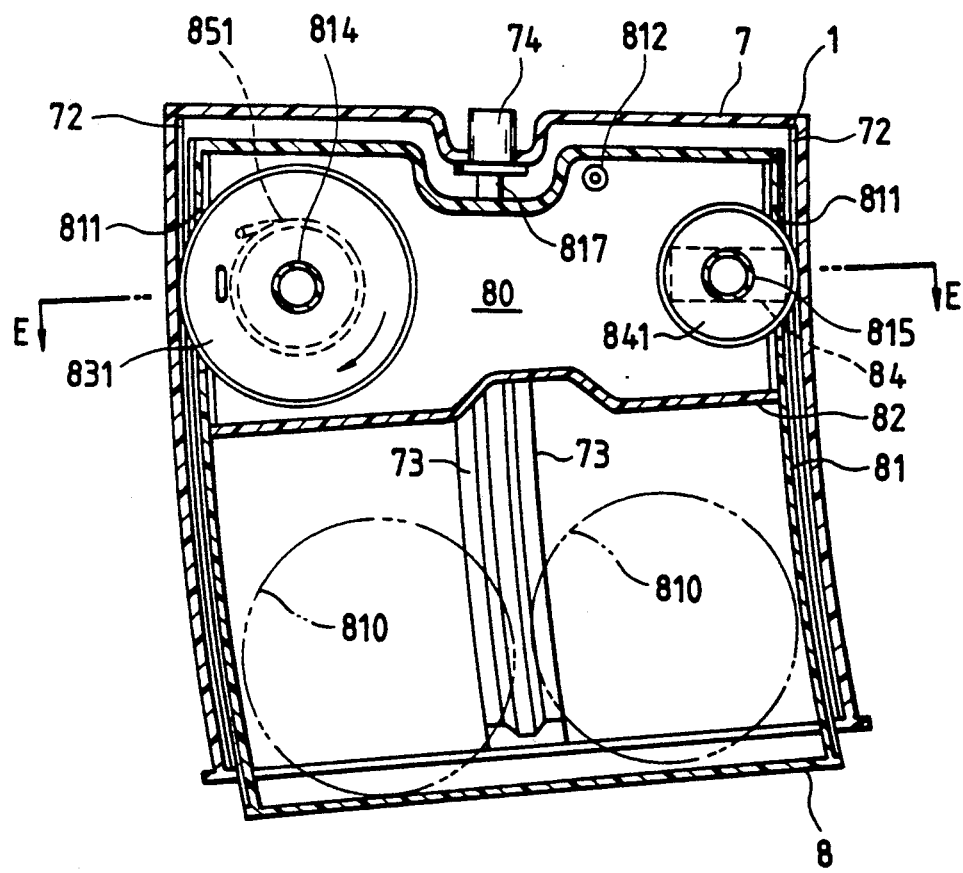
FIG. 10 is a horizontal sectional view showing the container holder of the second embodiment in a state where the inner case is positioned within the outer case.
Figure 11:
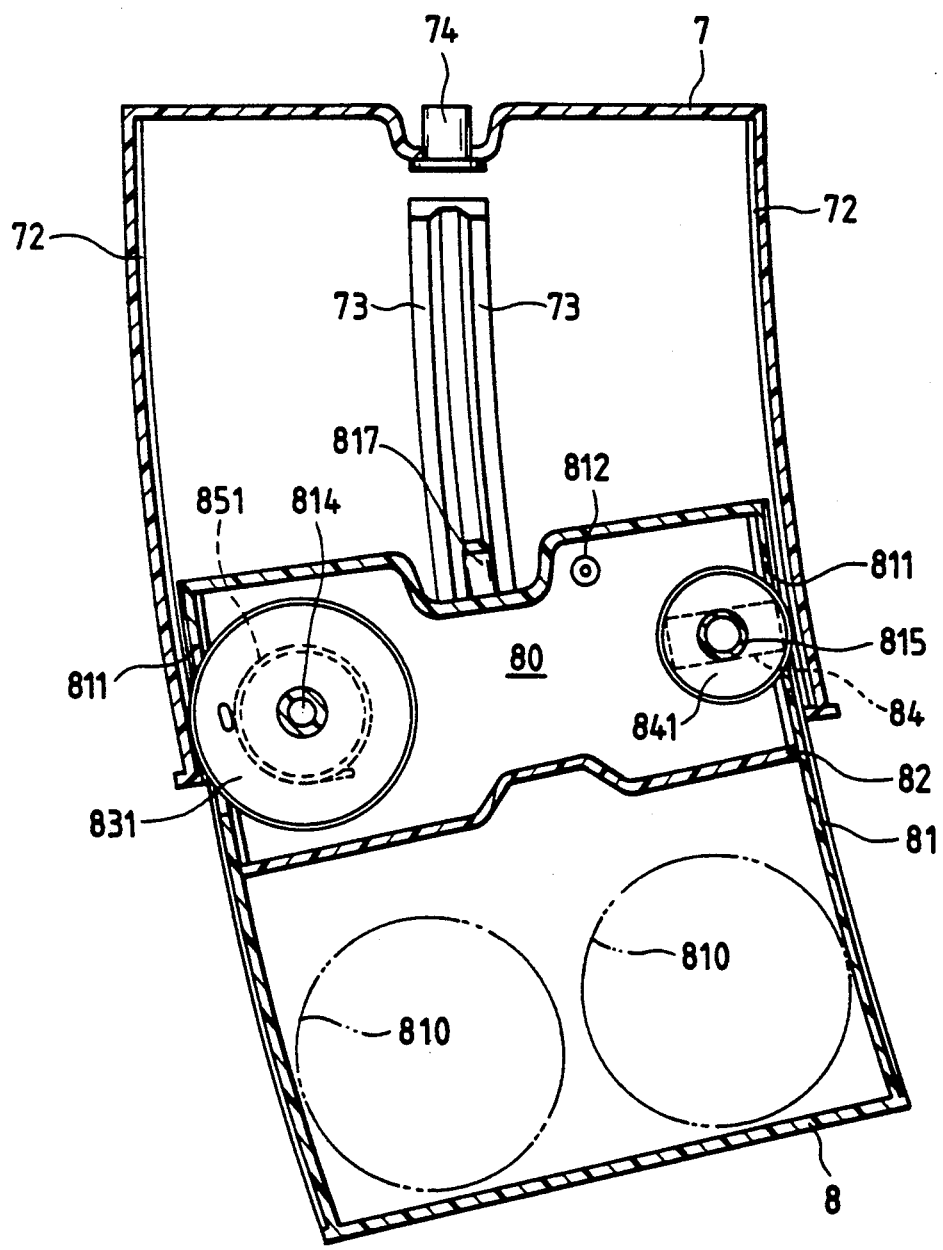
FIG. 11 is a horizontal sectional view showing the container holder according to the second embodiment in a state where the inner case is positioned outside of the outer case so as to allow a user to access to containers held by the holder.

A container holder according to a second embodiment of the present invention will now be described. In the container holder of the second embodiment, as shown in FIG. 8, an outer case 7 and an inner case 8 are both arcuate, and of the inner and outer cases, one conforms to the other in the arcuate shape. The outer case 7 is arcuate curving gradually to the right from the rear side to the front side. The outer case 7 is shaped like a box, and includes a chamber 70 formed therein and an opening 71 as in the first embodiment. As shown in FIGS. 10 and 11, the outer case 7 is formed with racks 72 extending in the in- and out-directions of the inner case 8 along the arcuate inner surfaces of both sides, and with guide ridges 73, 73 for guiding the swing frames 90 and 91, to be described later, on the bottom wall. A push-lock-open clip 74 is provided on the rear wall of the chamber 70, as in the first embodiment.

Figure 9:
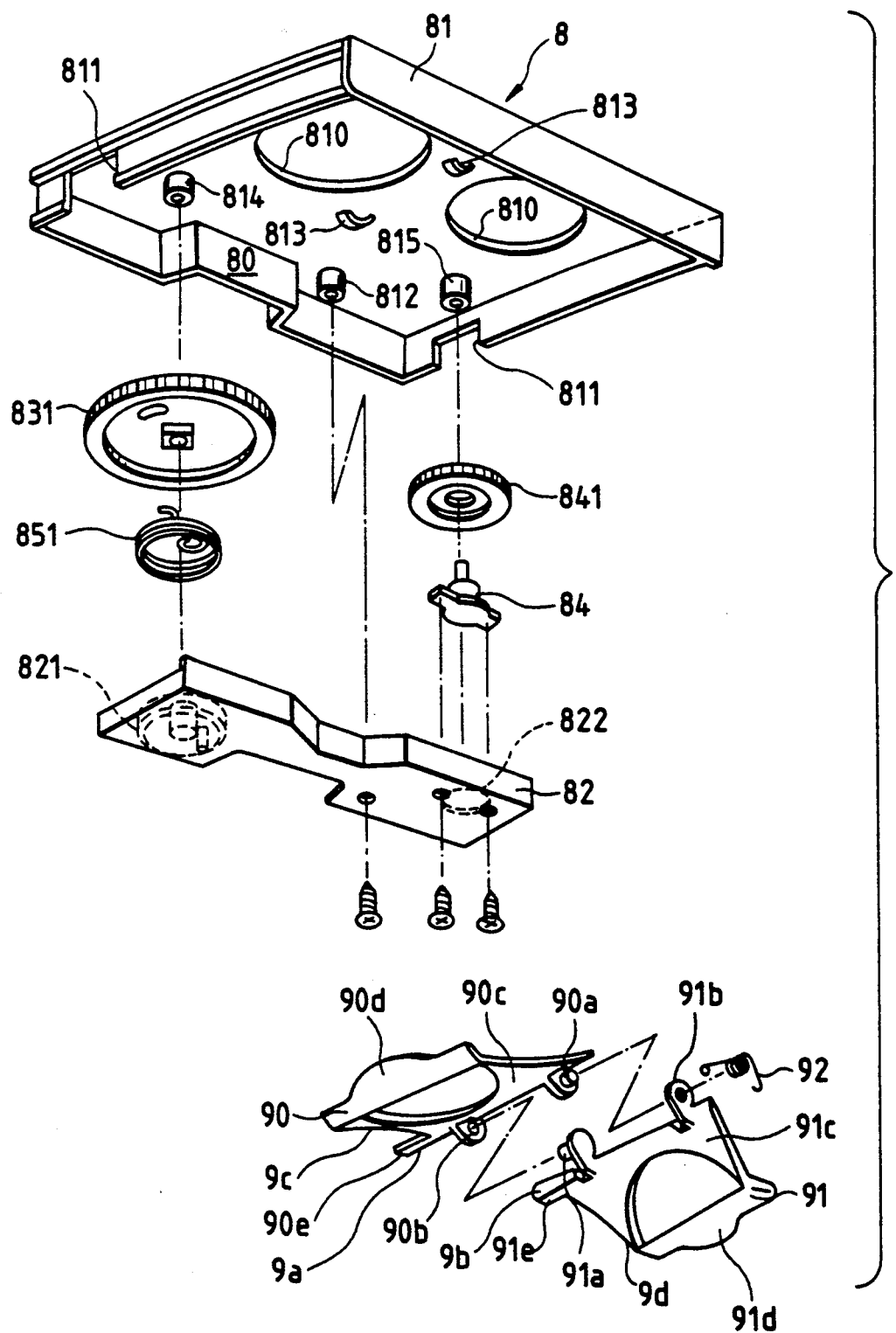
FIG. 9 is an exploded perspective view showing the inner case and the swing frame of the container holder according to the second embodiment.

The inner case 8 is shaped arcuate in conformity with the outer case 7. As shown in FIGS. 8 and 9, the inner case 8 includes a main body 81 not having a bottom wall, and a bottom member 82 forming a gear chamber 80 in cooperation with the rear wall of the main body 81. The main body 81, as in the first embodiment, includes two circular holder holes 810, two openings 811, a single engaging portion -812, which is provided on the inner surface of the top wall thereof and serves to fix the bottom member 82 thereto, two bearings 813 aligned along the in- and out-direction for rotatably supporting the swing frames 90 and 91, a bearing 814 for receiving a pinion 831 to be described later, and a bearing 815 for receiving a gear 841. The rear wall of the main body 81 includes a lock pin 817 capable of being releasably locked into the push-lock-open clip 74, as shown in FIGS. 10 and 11.

As shown in FIG. 9, the bottom member 82, as in the first embodiment, includes a seat 821 containing a bearing disposed therein which confronts the bearing 814, and another seat 822 to confront with the bearing 815. The gear chamber 80, defined by the main body 81 and the bottom member 82 contains a pinion 831, rotatably supported by the bearing 814 and the bearing disposed within seat 821, which meshes with one of the racks 72. The gear chamber 80 also contains an oil damper 84 which is fixed to the seat 822 and is provided with a gear 841 to be rotatably and axially supported by the bearing 815. Moreover, the gear chamber 0 contains a torsion coiled spring 851, one end of which is held by the pinion 831 and the other end of which is held by the seat 21 of the bottom member 82.

Figure 12:
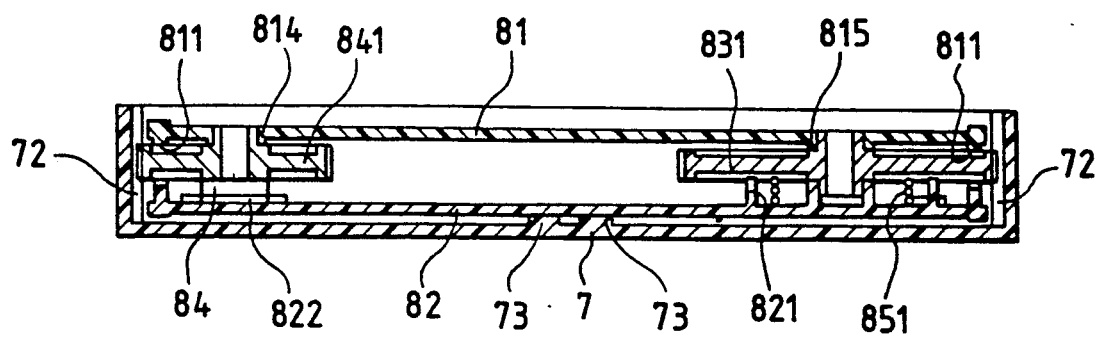
FIG. 12 is a sectional view taken along line E—E in FIG. 10.
Figure 13:
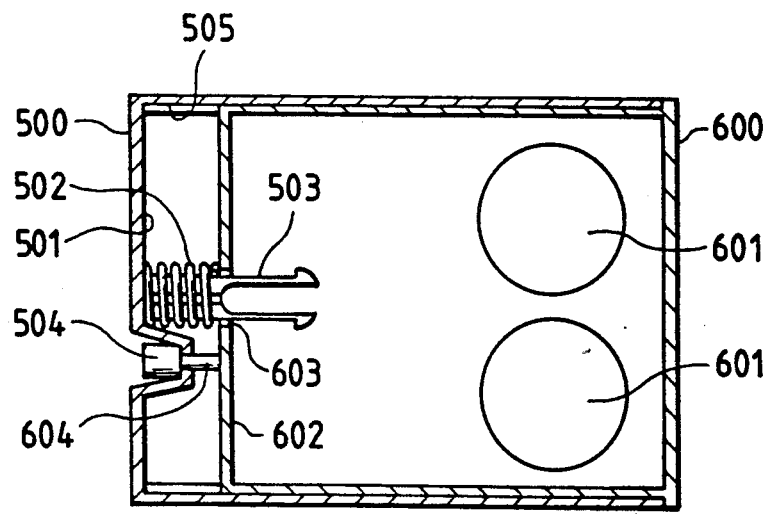
FIG. 13 (PRIOR ART) is a horizontal cross sectional view showing a conventional container holder.

The pinion 831 and the gear 841, as shown in FIGS. 10, 11 and 12, partially protrude from the openings 811 of the main body 1, respectively, so that the pinion and the gear engage with the racks 72 of the outer case 7. One turn of each of the pinion and the gear is set to be equal to the- in/out length of the inner case 8. The torsion coiled spring 851 is arranged so that its biasing force causes the pinion 831 to be rotated in such a direction that the inner case 8, disposed within the outer case 7, is moved so as to be outside the outer case 7. The torsion coiled spring 851 also includes an axial biasing force component which is caused by spring 851 vertically compressed along its axis to fit into pinion 831 as shown in FIG. 9.

The swing frame 90, as shown in FIGS. 8 and 9, includes a forwardly protruded shaft portion 90a, a bearing 90b located rearwardly of the shaft portion 90a, a support section 90c connecting the shaft portion 90a to the bearing 90b, its one end and having a cant 9c in the rearward portion, a holder section 90d formed in the other end of the support section 90c, and a contact portion 90e protruding from the rear side of the supporting section 90c and having a contact surface 9a at a predetermined distance apart from an axial line connecting the shaft portion 90a and the bearing 90b.

Another swing frame 91 is constructed to be symmetrical with respect to the swing frame 90 except that a shaft portion 91a extends rearwardly and a bearing 91b is located forwardly of the shaft portion 91a. The swing frame 91 includes a support section 91c connecting the shaft portion 91a to the bearing portion 91b at its one end and having a cant 9d in the rearward portion, a holder section 91d formed in the other end of the support section 91c, a contact portion 91e protruding from the rear side of the supporting section 91c and a contact surface 9b at a predetermined distance apart from the axial line of the shaft portion 91a and the bearing 91b.

The swing frames 90 and 91 are in contact with and rotatably supported by the inner case 8 in such a manner that the shaft portion 90a is inserted into the bearing 91b, a torsion coiled spring 92 is applied thereto, and then the shaft portion 90a is inserted through the torsion coiled spring into the bearing 813 located in the forward portion of the inner case 8, whereas the shaft portion 91a is inserted into the bearing 90b, and then, inserted into the bearing 813 in the rearward portion of the inner case 8. The swing frames 90 and 91 are biased by the torsion coiled spring 92 such that they approach to each other, that is, the holder sections 90d and 91d are urged towards a substantially horizontal position.

To use the container holder thus constructed, an operator slightly pushes the front end of the inner case 8, with his finger or the like, toward the outer case 7 to release the push-lock-open clip 74 and the lock pin 817 from a locked state, whereby the biasing force of the torsion coiled spring 851 can begin to drive the pinion 831. The pinion 831 rotates on the rack 72 as shown in FIG. 10. The inner case 8 and the swing frames 90 and 91, as shown in FIG. 11, are automatically pulled out of the outer case through an arcuate path, by the length of one turn of the pinion 831, viz., the in/out length of the inner case 8. In FIGS. 10 and 11, the swing frames 90 and 91 are omitted. During this movement, because the pinion 831 moves on the rack 72 and the gear 841 of the oil damper 84 is in mesh with the rack 72, a smooth movement-can be realized. Thus, the container holder can be extended to hold the containers through a smooth operation.

When the inner case 8 is pulled out of the inner case 7, the swing frames 90 and 91 are released from the restriction imposed by the outer case 7, and are opened by the coiled spring 92. Once the swing frames 90 and 91 open, the contact surfaces 9a and 9b of the contact portions 90e and 91e come in contact with each other, so that the holder portions 90d and 91d are maintained substantially horizontal to each other and hence the container can be held.

When the container holder is not in use, the operator can push the front end of the inner case 8 with his finger, toward the outer case 7 against the biasing force of the coiled spring 851. As the inner case moves, the cants 9c and 9d of the support sections 90c and 91c of the swing frames 90 and 91 slide to contact the outer case 7. In turn, the swing frames 90 and 91 are turned upwardly against the biasing force of the torsion coiled spring 92, and the contact surfaces 9a and 9b of the swing frames are guided by the guide ridges 73, 73 while being accommodated within the inner case 8. Finally, the push-lock-open clip 74 and the lock pin 817 are interlocked, and the inner case 8 and the swing frames 90 and 91 are fully accommodated within the outer case 7.

Under this condition, even when clearances between the inner and outer cases 8 and 7 exist at the top and bottom, and right and left sides of the inner-case 8, and these clearances are inevitably formed, both cases are firmly held in the horizontal and the vertical directions, thereby avoiding the clattering noises associated with the known designs. This is accomplished as a result of the pinion biasing force of the torsion coiled spring 851 pressing the pinion 831 against the rack 72 whereby the pinion 831 engages with the rack 72 as shown in FIG. 12. Additionally, the inner and outer cases 8 and 7 are firmly held vertically as the result of the axial biasing force of the coiled spring 92 causing the contact surfaces 9a, 9b of the swing frames 90, 91 to vertically press against the guide ridges 73, 73 of the outer case 7.

As described above, the container holder of the second embodiment can obtain the beneficial effects comparable with those obtained by the first embodiment. In the second embodiment, it is noted that the inner case is pulled out of the outer case through an arcuate path. This arcuate path feature further minimizes the problems associated with operating the container holder such as the driver inadvertently touching the torque control lever or the like.

As seen from the foregoing description, in the container holder of the present invention, the outer case includes the rack, and the inner case includes the pinions and the torsion coiled spring. The biasing force of the coiled spring for the pinion and the axial biasing force of the same cooperate to firmly hold the inner and the outer cases both horizontally and vertically. The container holder of the invention can effectively prevent generation of the offensive sound and further prevent the scratching of the holder itself. It can reliably hold the containers in response to only one action by the operator. In this respect, the container holder can be handled operated easily.

While specific embodiments have been described, variations thereto will occur to those skilled in the art within the scope of the present inventive concepts which are delineated by the following claims.

What is claimed is:

1. A container holder comprising;
   a box-like outer case having an opening at one end;
   an inner case formed with a holder hole for receiving a container and held by said outer case in such a way that said inner case is freely put in and out of said outer case in substantially horizontal direction;
   a rack formed on an inner surface of said outer case so as to extend in a direction in which said inner case is put in and out of said outer case;
   a pinion rotatably supported to said inner case and meshed with said rack; and
   a torsion called spring serving to apply a first biasing force onto said pinion so as to drive said pinion in a horizontal direction in which said inner case being put within said outer case is put of said outer case and wherein said coiled spring is axially compressed in a vertical direction to apply a second biasing force onto said pinion in said vertical axial direction so as to maintain, contact and firmly support said inner case through said pinion to said outer case in cooperation with said first biasing force.

2. The container holder according to claim 1, wherein said torsion coiled spring includes one end attached to said pinion and a second end attached to said inner case.

3. The container holder according to claim 1, wherein said container holder is adapted to be installed in an automotive vehicle.

4. The container holder according to claim 1, further comprising guide means for guiding said inner case on said outer case.

5. The container holder according to claim 1, wherein said outer case is arcuate, and said inner case is arcuate in conformity with said outer case.

6. The container holder according to claim 1, further including means for interlocking said inner case with said outer case whereby said inner case is prevented from moving from said first position to said second position by said first biasing force, said interlocking means being adapted to release upon application of a force to said inner case against said first biasing force.

7. The container holder according to claim 1, further comprising a swing frame swingably supported by said inner case, said swing frame serving to hold said container in cooperation with said at least one holder hole and being arranged so as to be automatically retracted from and accommodated in said inner case in conjunction with the movement of said inner case.

8. The container holder according to claim 7, further including a second biasing means for applying a vertical biasing force onto said swing frame so as to firmly support said inner case through said swing frame to said outer case in cooperation with said torsion coil spring.

* * * * *